United States Patent
Cronin et al.

(10) Patent No.: US 12,347,170 B2
(45) Date of Patent: Jul. 1, 2025

(54) APPARATUS, METHODS AND COMPUTER PROGRAMS FOR CALIBRATING MACHINE LEARNING SYSTEMS

(71) Applicant: Nokia Technologies Oy, Espoo (FI)

(72) Inventors: Harry Cronin, Cambridge (GB); Christopher Wright, London (GB); William Schnabel, Surrey (GB); Phil Catton, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 373 days.

(21) Appl. No.: 17/702,620

(22) Filed: Mar. 23, 2022

(65) Prior Publication Data
US 2022/0309769 A1    Sep. 29, 2022

(30) Foreign Application Priority Data

Mar. 29, 2021    (EP) .................................. 21165426

(51) Int. Cl.
*G06V 10/774*    (2022.01)
*G06F 1/16*    (2006.01)
(Continued)

(52) U.S. Cl.
CPC .......... *G06V 10/774* (2022.01); *G06F 1/1641* (2013.01); *G06T 3/00* (2013.01);
(Continued)

(58) Field of Classification Search
CPC .... G06V 10/774; G06V 10/12; G06V 10/776; G06V 2201/02; G06F 1/1641;
(Continued)

(56) References Cited

U.S. PATENT DOCUMENTS 10,332,249 B2    6/2019    Dwivedi et al.
10,810,732 B2    10/2020    Dwivedi et al.
(Continued)

FOREIGN PATENT DOCUMENTS

KR    10-2020-0119639 A    10/2020
WO    2021/055457 A1    3/2021

OTHER PUBLICATIONS

"Sony and Microsoft Develop AI Imaging Chip—What it Means for Industry", Techwire Asia, Retrieved on Mar. 7, 2022, Webpage available at : https://techwireasia.com/2020/05/sony-and-microsofts-ai-chip-for-smart-cameras-what-it-means-for-industry/.
"Adapting Models to the Real World: On-Device Training for Edge Model Adaptation", Arm Community, Retrieved on Mar. 7, 2022, Webpage available at : https://community.arm.com/developer/research/b/articles/posts/adapting-models-to-the-real-world-on-device-training-for-edge-model-adaptation.
(Continued)

*Primary Examiner* — Bobbak Safaipour
(74) *Attorney, Agent, or Firm* — ALSTON & BIRD LLP (57) ABSTRACT

Examples of the disclosure relate to apparatus, methods and computer programs for calibrating machine learning systems by using images captured by an imaging device. The apparatus can comprise means for: enabling at least one of a first device or second device to display one or more calibration images, the first device comprising an embedded machine learning system wherein the one or more calibration images are for calibrating the embedded machine learning system. The apparatus can also comprise means for controlling an imaging device to capture, at least part of, the one or more calibration images, wherein the imaging device is provided within the first device, and using the one or more calibration images captured by the imaging device to calibrate the embedded machine learning system of the first device.

20 Claims, 5 Drawing Sheets

(51) Int. Cl.
*G06T 3/00* (2006.01)
*G06V 10/12* (2022.01)
*G06V 10/776* (2022.01)

(52) U.S. Cl.
CPC ............ *G06V 10/12* (2022.01); *G06V 10/776* (2022.01); *G06V 2201/02* (2022.01)

(58) Field of Classification Search
CPC .... G06F 1/1618; G06F 1/1677; G06F 1/1686; G06T 3/00; G06N 20/00
See application file for complete search history.

(56) References Cited

U.S. PATENT DOCUMENTS

| | | | |
|---|---|---|---|
| 11,283,971 B2* | 3/2022 | Moon | G06F 1/1652 |
| 2012/0057053 A1* | 3/2012 | Mallon | G06T 5/80 |
| | | | 348/E5.079 |
| 2018/0365849 A1* | 12/2018 | Taguchi | G06T 5/50 |
| 2019/0156202 A1 | 5/2019 | Falk et al. | |
| 2020/0226419 A1* | 7/2020 | Knaan | G06T 7/593 |
| 2020/0329178 A1 | 10/2020 | Moon et al. | |
| 2020/0342652 A1* | 10/2020 | Rowell | G06V 10/82 |
| 2020/0344411 A1 | 10/2020 | Cragg et al. | |
| 2020/0348899 A1 | 11/2020 | Shaker et al. | |
| 2021/0081712 A1* | 3/2021 | Saunders | G06T 15/40 |
| 2022/0207674 A1* | 6/2022 | Pincenti | H04N 17/002 |
| 2022/0309769 A1* | 9/2022 | Cronin | G06N 20/00 |
| 2024/0122578 A1* | 4/2024 | Brenner | G06T 7/0012 |

OTHER PUBLICATIONS

"An in-depth look at Core ML 3", MachineThink, Retrieved on Mar. 7, 2022, Webpage available at : https://machinethink.net/blog/new-in-coreml3/.

Wu et al., "Enabling On-Device CNN Training by Self-Supervised Instance Filtering and Error Map Pruning", arXiv, Jul. 7, 2020, pp. 1-13.

"Using Radioactive Data to Detect If a Dataset was used for Training", Meta AI, Retrieved on Mar. 7, 2022, Webpage available at : https://ai.facebook.com/blog/using-radioactive-data-to-detect-if-a-data-set-was-used-for-training/.

Shumailov et al., "Sitatapatra: Blocking the Transfer of Adversarial Samples", arXiv, Nov. 21, 2019, pp. 1-9.

"How Microsoft built its folding Android Phone", The Verge, Retrieved on Mar. 7, 2022, Webpage available at : https://www.theverge.com/21426955/microsoft-surface-duo-folding-android-phone-history.

Tan et al., "Automatic Camera Calibration Using Active Displays of a Virtual Pattern", Sensors, vol. 17, Mar. 27, 2017, pp. 1-13.

"Machine Learning and Mobile: Deploying Models on The Edge", Algorithmia, Jun. 21, 2018, 8 pages.

Extended European Search Report received for corresponding European Patent Application No. 21165426.4, dated Sep. 14, 2021, 10 pages.

Office Action for European Application No. 21165426.4 dated Aug. 20, 2024, 9 pages.

* cited by examiner

APPARATUS, METHODS AND COMPUTER PROGRAMS FOR CALIBRATING MACHINE LEARNING SYSTEMS

RELATED APPLICATION

This application claims priority to the European patent application number 21165426.4, filed on Mar. 29, 2021, the content of which is incorporated herein by reference in its entirety.

TECHNOLOGICAL FIELD

Examples of the disclosure relate to apparatus, methods and computer programs for calibrating machine learning systems. Some relate to apparatus, methods and computer programs for calibrating machine learning systems by using images captured by an imaging device.

BACKGROUND

Machine learning systems can be calibrated and tested to ensure that they are functioning correctly. This can be useful for applications, such as health monitoring applications, which require high reliability of the machine learning systems. Calibration of such systems is problematic where the machine learning system is embedded within dedicated hardware, as the calibration may require inputs to be provided via the hardware.

BRIEF SUMMARY

According to various, but not necessarily all, examples of the disclosure there is provided an apparatus comprising means for: enabling at least one of a first device or second device to display one or more calibration images, the first device comprising an embedded machine learning system wherein the one or more calibration images are for calibrating the embedded machine learning system; controlling an imaging device to capture, at least part of, the one or more calibration images, wherein the imaging device is provided within the first device; and using the one or more calibration images captured by the imaging device to calibrate the embedded machine learning system of the first device.

The one or more calibration images may comprise one or more training images configured to enable training of the embedded machine learning system.

The one or more training images may comprise images of subject matter that the embedded machine learning system has been designed to recognise.

The one or more training images may comprise modifications to enable enhanced training of the embedded machine learning system.

The one or more calibration images may comprise one or more test images configured to enable testing of the embedded machine learning system.

The one or more test images may comprise one or more predetermined patterns that are configured to provide one or more corresponding predetermined outputs from a correctly trained embedded machine learning system.

The first device may be a foldable device that can be arranged in a folded configuration in which the imaging device at least partially faces at least one display of the first device.

The means may be for geometrically distorting the one or more calibration images to account for the configuration of the foldable device when the imaging device captures the images of the one or more calibration images.

The means may be for enabling the imaging device to capture a reflection of the one or more calibration images displayed by the first device.

The means may be for generating the one or more calibration images for display on one or more displays of the first device.

The means may be for providing an output in response to the embedded machine learning system responding incorrectly to one or more of the test images.

The output may comprise any one or more of: restricting use of the embedded machine learning system, blocking use of the embedded machine learning system, providing a notification to a user of the first and/or second device, enabling a reconfiguration of the embedded machine learning system.

The means may be for determining a timing for displaying the one or more calibration images.

According to various, but not necessarily all, examples of the disclosure there may be provided an apparatus comprising at least one processor; and at least one memory including computer program code, the at least one memory and the computer program code configured to, with the at least one processor, cause the apparatus at least to perform:
  enabling at least one of a first device or second device to display one or more calibration images, the first device comprising an embedded machine learning system wherein the one or more calibration images are for calibrating the embedded machine learning system;
  controlling an imaging device to capture, at least part of, the one or more calibration images, wherein the imaging device is provided within the first device; and
  using the one or more calibration images captured by the imaging device to calibrate the embedded machine learning system of the first device.

A user device comprising an apparatus as described herein.

A communications device comprising an apparatus as described herein.

A foldable device comprising an apparatus as described herein.

According to various, but not necessarily all, examples of the disclosure there may be provided a method comprising:
  enabling at least one of a first device or second device to display one or more calibration images, the first device comprising an embedded machine learning system wherein the one or more calibration images are for calibrating the embedded machine learning system;
  controlling an imaging device to capture, at least part of, the one or more calibration images, wherein the imaging device is provided within the first device; and
  using the one or more calibration images captured by the imaging device to calibrate the embedded machine learning system of the first device.

According to various, but not necessarily all, examples of the disclosure there may be provided a computer program comprising computer program instructions that, when executed by processing circuitry, cause:
  enabling at least one of a first device or second device to display one or more calibration images, the first device comprising an embedded machine learning system wherein the one or more calibration images are for calibrating the embedded machine learning system;
  controlling an imaging device to capture, at least part of, the one or more calibration images, wherein the imaging device is provided within the first device; and using the one or more calibration images captured by the imaging device to calibrate the embedded machine learning system of the first device.

According to various, but not necessarily all, examples of the disclosure there may be provided an apparatus comprising means for:
displaying one or more calibration images on a display of a foldable device wherein the one or more calibration images are for calibrating a machine learning system; and
controlling an imaging device, provided within the foldable device, to capture, at least part of, the one or more calibration images when the foldable device is in an, at least partially closed configuration in which the imaging device at least partially faces the display.

According to various, but not necessarily all, examples of the disclosure there may be provided an apparatus comprising means for:
geometrically distorting one or more calibration images for display on at least one of a display of a first device or a display of a second device;
enabling display of the one or more geometrically distorted calibration images on the at least one display of the first device or the display of the second device;
controlling an imaging device to capture, at least part of, the one or more geometrically distorted calibration images on the at least one display of the first device or the display of the second device, wherein the imaging device is provided within the first device; and
using the one or more captured geometrically distorted images to calibrate a machine learning system.

BRIEF DESCRIPTION

Some examples will now be described with reference to the accompanying drawings in which.

DETAILED DESCRIPTION

Examples of the disclosure relates to apparatus, methods and computer programs that can be used to calibrate machine learning systems. In examples of the disclosure calibration images can be generated for displaying to a device comprising a machine learning system. The device can capture an image of the calibration image and use that image to train and/or test the machine learning system.

Figure 1:
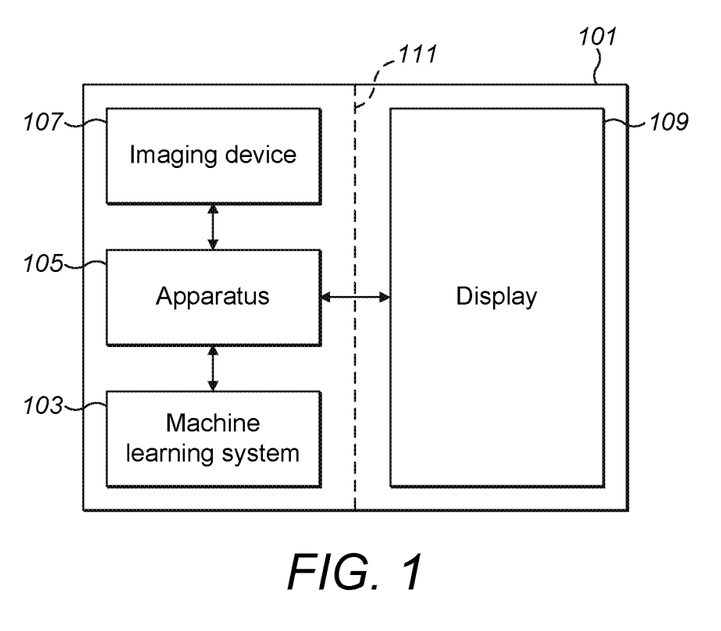
FIG. 1 shows an example device.

FIG. 1 schematically shows an example device 101 that can be used to implement examples of the disclosure. The example device 101 comprises a machine learning system 103, an apparatus 105, an imaging device 107 and a display 109. It is to be appreciated that only components that are referred to in the following description are shown in FIG. 1. Additional components could be provided in some examples of the disclosure. For instance, the device 101 could comprise a power source and one or more transceivers to enable communication.

The machine learning system 103 can be an embedded machine learning system 103. The embedded machine learning system 103 can comprise a machine learning system 103 that can be configured for self-analysis and calibration. The embedded machine learning system 103 can be configured to use images generated by the device 101 for the calibration of the embedded machine learning system 103.

The embedded machine learning system 103 can be configured to perform any suitable task. In examples of the disclosure the embedded machine learning system 103 can be configured to analyse and classify images. This can be used for health monitoring applications or any other suitable purpose. For instance, the embedded machine learning system 103 can be configured to analyse images of a user, or part of a user, of the device 101 to allow for monitoring of one or more health characteristics.

The embedded machine learning system 103 can use any type of machine learning such as statistical learning. The embedded machine learning system 103 can be configured to learn to perform one or more tasks, such as image recognition, without being explicitly programmed. The embedded machine learning system 103 learns from experience E with respect to some class of tasks T and performance measure P if its performance at tasks in T, as measured by P, improves with experience E. The embedded machine learning system 103 can learn from prior training data to make predictions on future data. The embedded machine learning system 103 can be configured to enable discrete outputs (for example classification, clustering) and continuous outputs (for example regression). The embedded machine learning system 103 may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

Figure 2:
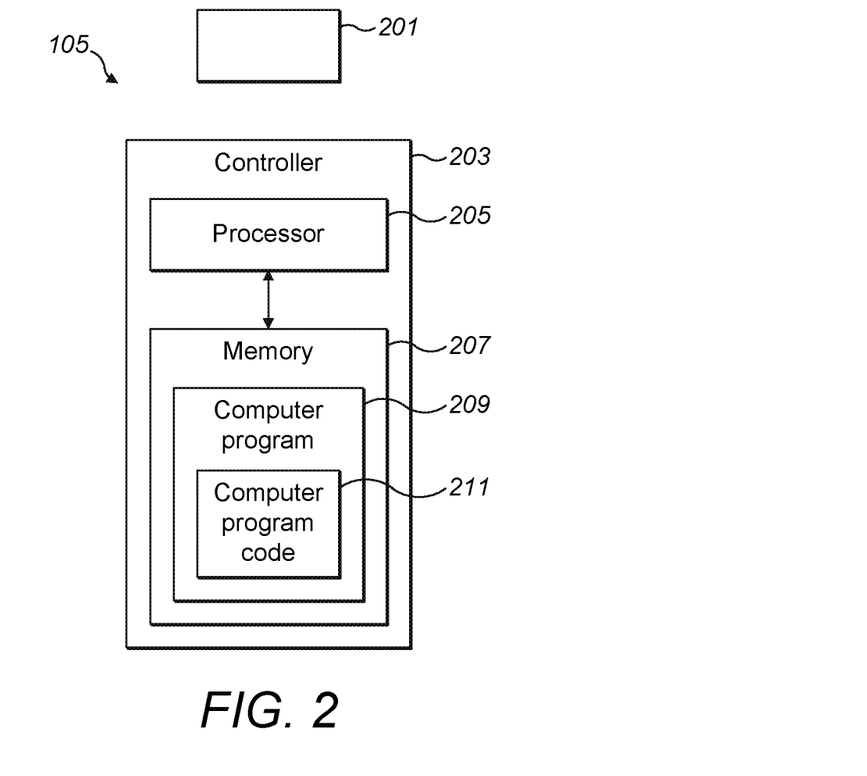
FIG. 2 shows an example apparatus.

The apparatus 105 can comprise a controller 203 comprising a processor 205 and memory 207 that can be as shown in FIG. 2. The apparatus 105 can be configured to enable control of the device 101. For example, the apparatus 105 can be configured to control the images that are displayed on the display 109 and/or the images that are captured by the imaging device 107. The apparatus 105 can also be configured to control the embedded machine learning system 103.

The imaging device 107 can comprise any means for capturing an image. The imaging device 107 can comprise one or more cameras or any other suitable means for capturing images. In the example of FIG. 1 only one imaging device 107 is shown. However, it is to be appreciated that the device 101 could comprise a plurality of imaging devices 107 that could be positioned in different locations within the device 101.

The imaging device 107 can comprise one or more sensors where the sensors can be configured to detect images. The sensors of the imaging device 107 can be coupled to the apparatus 105 to enable detected images to be stored in an image storage module. In some examples the image storage module could be part of the memory 207 of the apparatus 105. The sensors of the imaging device 107 can comprise any suitable type of image sensor. For instance, the sensor of the imaging device 107 can comprise a digital image sensor such as a charge-coupled-device (CCD) or a complementary metal-oxide-semiconductor (CMOS).

The imaging device 107 is configured to obtain an input that can be used to calibrate the embedded machine learning system 103. The input that is obtained to enable the calibration is a hardware level input. The hardware level input is an input that is obtained by the machine learning system via one or more hardware components of the device 101 within which the embedded machine learning system 103 is provided rather than via software. In this example the hardware level input is obtained via the imaging device 107. The hardware level input can be provided in the same form, or substantially the same form as normal inputs to the machine learning system 103. The input that is obtained to enable the calibration is an external input that that is captured by the imaging device 107. In these examples of the disclosure the input comprises an optical signal.

The imaging device 107 can be controlled by the apparatus 105 to enable images to be captured. Once an image has been captured it can be stored in the image storage module and/or transmitted to a third party.

The display 109 can comprise any means that can be configured to enable information to be displayed. The display can enable visual rendering of images or other information. The display 109 can be controlled by the apparatus 105 to display one or more calibration images or any other suitable types of images.

In the example of FIG. 1 the device 101 is a foldable device. The device 101 comprises a hinge 111 or other means that enables the device to be moved between an open position and a closed position. When the device is in the open position the display 109 can be viewed by the user of the device. When the device 101 is in the closed position part of the folded device 101 overlays the display 101. In this closed position the imaging device 107, or one of the imaging devices 107 faces the display 109. When the device 101 is being moved between an open position and a closed position the display 109 will be within the field of view of the imaging device. In such examples the imaging device 107 can be controlled to capture images of the display 109 or part of the display. Other ways of folding or configuring the device 101 could be used in other examples of the disclosure.

FIG. 2 shows an example apparatus 105. The apparatus 105 illustrated in FIG. 2 can be a chip or a chip-set. The apparatus 105 can be provided within a device 101 such as a mobile phone, personal electronics device or any other suitable type of device 101. The apparatus 105 could be provided within devices 101 as shown in FIG. 1.

In the example of FIG. 2 the apparatus 105 comprises a controller 203. In the example of FIG. 2 the implementation of the controller 203 can be as controller circuitry. In some examples the controller 203 can be implemented in hardware alone, have certain aspects in software including firmware alone or can be a combination of hardware and software (including firmware).

As illustrated in FIG. 2 the controller 203 can be implemented using instructions that enable hardware functionality, for example, by using executable instructions of a computer program 209 in a general-purpose or special-purpose processor 205 that can be stored on a computer readable storage medium (disk, memory etc.) to be executed by such a processor 205.

The processor 205 is configured to read from and write to the memory 207. The processor 205 can also comprise an output interface via which data and/or commands are output by the processor 205 and an input interface via which data and/or commands are input to the processor 205.

The memory 207 is configured to store a computer program 209 comprising computer program instructions (computer program code 211) that controls the operation of the apparatus 105 when loaded into the processor 205. The computer program instructions, of the computer program 209, provide the logic and routines that enables the apparatus 105 to perform the methods illustrated in FIGS. 3 and 5 to 6. The processor 205 by reading the memory 207 is able to load and execute the computer program 209.

Figure 3:
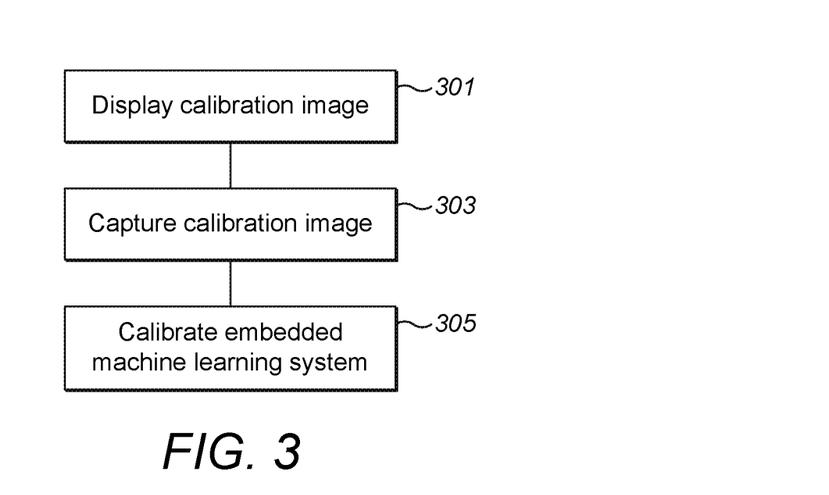
FIG. 3 shows an example method.

The apparatus 105 therefore comprises: at least one processor 205; and at least one memory 207 including computer program code 211, the at least one memory 207 and the computer program code 211 configured to, with the at least one processor 205, cause the apparatus 105 at least to perform:

enabling 301 at least one of a first device 101 or second device to display one or more calibration images, the first device 101 comprising an embedded machine learning system 103 wherein the one or more calibration images are for calibrating the embedded machine learning system 103;

controlling 303 an imaging device 107 to capture, at least part of, the one or more calibration images, wherein the imaging device 107 is provided within the first device 101; and using 305 the one or more calibration images captured by the imaging device 107 to calibrate the embedded machine learning system 103 of the first device 101.

As illustrated in FIG. 2 the computer program 209 can arrive at the apparatus 105 via any suitable delivery mechanism 201. The delivery mechanism 201 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 209. The delivery mechanism can be a signal configured to reliably transfer the computer program 209. The apparatus 105 can propagate or transmit the computer program 209 as a computer data signal. In some examples the computer program 209 can be transmitted to the apparatus 105 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 209 comprises computer program instructions for causing an apparatus 105 to perform at least the following:

enabling 301 at least one of a first device 101 or second device to display one or more calibration images, the first device 101 comprising an embedded machine learning system 103 wherein the one or more calibration images are for calibrating the embedded machine learning system 103;

controlling 303 an imaging device 107 to capture, at least part of, the one or more calibration images, wherein the imaging device 107 is provided within the first device 101; and using 305 the one or more calibration images captured by the imaging device 107 to calibrate the embedded machine learning system 103 of the first device 101.

The computer program instructions can be comprised in a computer program 209, a non-transitory computer readable medium, a computer program product, a machine readable medium. In some but not necessarily all examples, the computer program instructions can be distributed over more than one computer program 209.

Although the memory 207 is illustrated as a single component/circuitry it can be implemented as one or more separate components/circuitry some or all of which can be integrated/removable and/or can provide permanent/semi-permanent/dynamic/cached storage.

Although the processor 205 is illustrated as a single component/circuitry it can be implemented as one or more separate components/circuitry some or all of which can be integrated/removable. The processor 205 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 5:
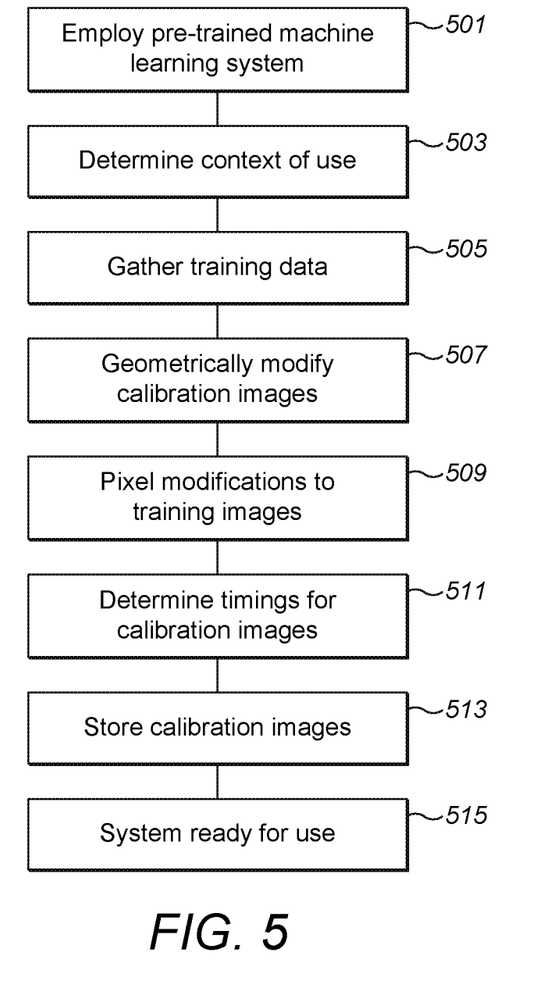
FIG. 5 shows another example method.
Figure 6:
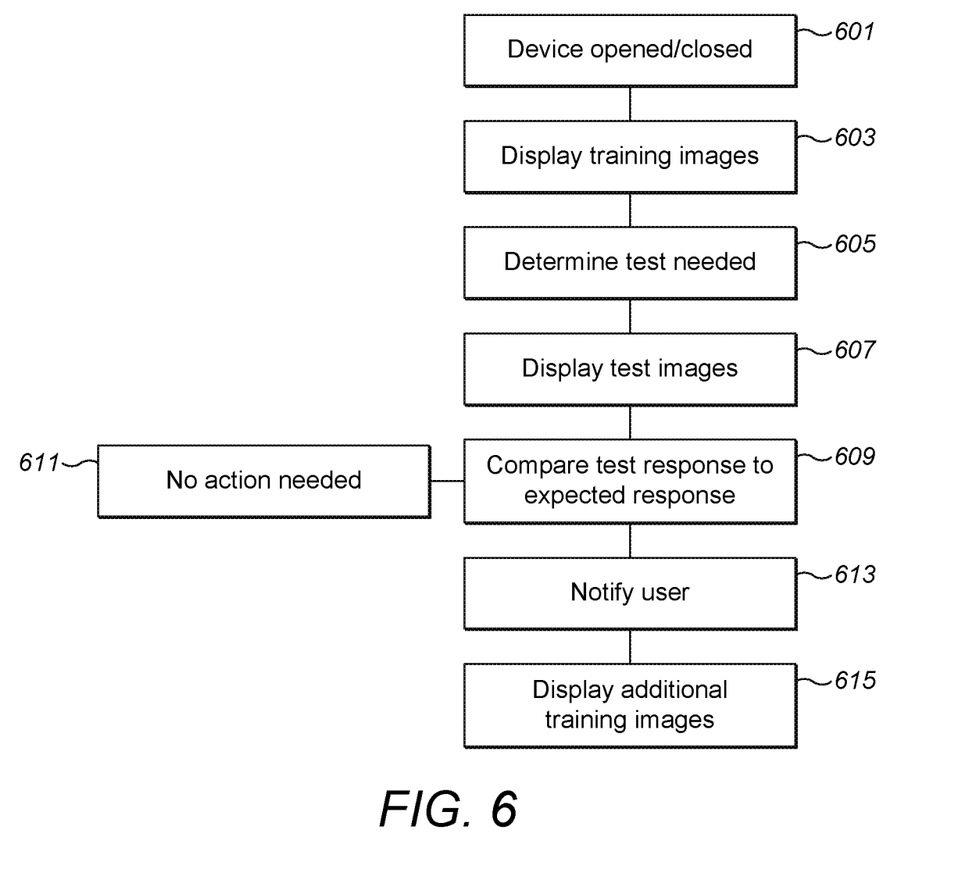
FIG. 6 shows another example method

The blocks illustrated in FIGS. 3 and 5 to 6 can represent steps in a method and/or sections of code in the computer program 209. The illustration of a particular order to the blocks does not necessarily imply that there is a required or preferred order for the blocks and the order and arrangement of the block can be varied. Furthermore, it can be possible for some blocks to be omitted.

FIG. 3 shows an example method according to examples of the disclosure. The method could be implemented using an apparatus 105 and device 101 as described above or using any other suitable type of device.

At block 301 the method comprises enabling at least one of a first device 101 or second device to display one or more calibration images. The first device 101 could be a device 101 as shown in FIG. 1 that comprises an imaging device 107 and an embedded machine learning system 103.

In some examples the one or more calibration images can be displayed on the display of the first device 101 in such a manner so that the imaging device 107 can capture the images. In such examples the device 101 could be a foldable, or otherwise deformable device 101 and the images could be displayed on the display 109 when the device 101 is in a partially closed position so that, at least part of the display 109 is within the field of view of the imaging device 107. In other examples the images could be displayed on the display 109 and the user could position the device 101 near a mirror or other reflective object so that the imaging device 107 can capture reflections of the calibration images. In these examples the device 101 need not be foldable or otherwise deformable.

In other examples the first device 101 could enable the one or more calibration images to be displayed by a second device. For instance, the first device 101 could transmit one or more calibration images to the second device. The second device could be a projector, a screen or another user device or any other suitable device that can be configured to display the calibration images. In such examples the first device 101 can be positioned so that the second device is within the field of view of the imaging device 107. This can enable the imaging device 107 of the first device 101 to be used to capture images that are displayed by the second device.

The one or more calibration images are for calibrating the embedded machine learning system 103 that is comprised within the first device 101. In some examples the one or more calibration images can comprise one or more training images that are configured to enable enhanced training of the embedded machine learning system 103. The enhanced training can comprise controlling the embedded machine learning system 103 to perform one or more tasks to ensure that the embedded machine learning system 103 remains configured to control the tasks that it has been designed to perform.

In some examples the enhanced training can comprise performing image recognition tasks to ensure that the embedded machine learning system 103 can still correctly identify the objects that it is designed to recognise. In such examples the training images can comprise images of subject matter that the embedded machine learning system 103 has been designed to recognise. In some examples the training images can comprise images of subject matter that the embedded machine learning system 103 has been designed to recognise with modifications to enable training of the embedded machine learning system 103. The modifications can comprise pixel level modifications. For example they can comprise adjustments that have been made to one or more pixels of the image. In some examples, the modifications enable the modified images to alter the parameters of the machine learning system 103 such that it becomes or remains susceptible to testing via the calibration images. For example, the modifications can cause the machine learning system 103 to produce a predictable output in response to a known input.

In some examples the calibration images can comprise one or more test images configured to enable testing of the embedded machine learning system 103. The testing can comprise requiring the embedded machine learning system 103 to perform one or more tasks and then dependent upon the outcomes of the one or more tasks it can be determined whether or not the embedded machine learning system 103 is still adequately performing the task which it was intended to perform.

The one or more test images can comprise any suitable images. In some examples the one or more test images can comprise one or more predetermined patterns that are configured to provide one or more corresponding predetermined outputs from a correctly trained embedded machine learning system. Therefore, and as mentioned above, a test image can be considered to be the known input that can cause the machine learning system 103 to produce a predictable output in response to it. The test image may effectively test one or more parameters of the embedded machine learning system 103, after its enhanced training using the modified training images.

In some examples the apparatus 105 can be configured to generate the calibration images that are used. For instance, the apparatus 105 could be configured to modify images of objects to generate one or more training images and/or the apparatus 105 could be configured to generate the test images comprising suitable patterns. In some examples the apparatus 105 could use a machine learning system, such as a neural network, to generate the calibration images. In other examples the calibration images could be transmitted to the device 101 from another device and/or the calibration images could be retrieved from storage as needed.

At block 303 the method comprises controlling an imaging device 107 to capture, at least part of, the one or more calibration images, wherein the imaging device 107 is provided within the first device 101. In some examples the imaging device 107 can be controlled to capture images from the display 109 of the same device 101. For example, the device 101 could be arranged into a folded configuration that positions the display 109, or part of the display 109, into the field of view of an imaging device 107 of the device 101.

In other examples the imaging device 107 can be controlled to capture images that are displayed by a second device. In such examples the first device 101 can be configured to provide the calibration images to the second device. For instance, the first device 101 could transmit one or more of the calibration mages to the second device.

At block 305 the method comprises using the one or more calibration images captured by the imaging device 107 to calibrate the embedded machine learning system 103 of the first device 101.

The calibration of the embedded machine learning system 103 can comprise the training or testing of the embedded machine learning system 103. The training of the embedded machine learning system 103 can occur at any suitable time. In some examples the training of the embedded machine learning system 103 can occur at predetermined time intervals or after the embedded machine learning system 103 has been used for a given number of times.

The testing of the embedded machine learning system 103 could also occur at set intervals. In some examples the testing of the embedded machine learning system 103 could occur before the embedded machine learning system 103 is used for a critical or important application. For instance, if the embedded machine learning system 103 is to be used for health monitoring this could be classed as a critical purpose because the consequences of an incorrect output from the embedded machine learning system 103 could impact upon the health of the user. In such cases the embedded machine learning system 103 could be tested prior to any use for such purpose. The apparatus 105 or device 101 may be configured to determine an expected use of the embedded machine learning system 103 for a particular purpose; for example, the purpose may be for, but not limited to, a healthcare monitoring application for the user. For example, calendar data may be accessed which indicates that a user has a healthcare appointment due to happen within a threshold time period, such as a predefined number of minutes. Similarly, location data may be accessed which indicates that the user is located, for example, at a healthcare centre. Other sensor data, such as from one or more imaging devices and/or microphones of device 101 may be used to determine a context of the user device, for example that the user is in a healthcare setting.

When the test images are displayed the embedded machine learning system 103 can provide a correct output or an incorrect output. This can provide an indication as to whether or not the embedded machine learning system 103 is still correctly performing the functions and tasks that it was designed to do. If it is determined that the embedded machine learning system 103 is still performing the tasks correctly or with an adequate level of accuracy then the embedded machine learning system 103 can continue to be used and no change or modification is needed to the embedded machine learning system 103 or to the use of the device 101. In some examples a notification could be provided to the user of the device 101 to indicate that the embedded machine learning system 103 is functioning to an adequate performance level.

If it is determined that the embedded machine learning system 103 cannot be guaranteed or relied upon to perform the tasks correctly or that these tasks are being performed with an inadequate level of accuracy or that the machine learning system 103 is in a state other than a state in which it is known to perform the tasks correctly, then the apparatus 105 can be configured to provide one or more outputs in response to this determination. In some examples the output can comprise a notification to the user of the device 101. This notification could comprise information displayed on the display 109, or provided by any other suitable means, that informs the user that the embedded machine learning system 103 is no longer functioning as designed. This notification could be provided to the user of the first device 101 and/or the user of the second device.

In some examples the output that is provided by the apparatus 105 if the embedded machine learning system 103 is not functioning adequately could comprise the restriction or blocking of the use of the embedded machine learning system 103. For instance, in some examples the use of the embedded machine learning system 103 could be blocked so that it cannot be used at all. In other examples the use of the embedded machine learning system 103 could be restricted so that it can only be used for non-critical applications. For instance, it could be restricted so that it could not be used for a health monitoring application but could still be used for non-critical functions such as chat functions or games In some examples the output that is provided by the apparatus 105 could comprise enabling a reconfiguration of the embedded machine learning system 103. The reconfiguration could comprise a roll back to initial settings of the embedded machine learning system 103 or to other previous settings.

In some examples the apparatus 105 can be configured to determine a timing for displaying one or more of the calibration images. The apparatus 105 could be configured to determine the frequency at which the calibration images are needed. For instance the apparatus 105 can determine the time intervals between the displaying of calibration images and/or the apparatus 105 can determine the number of uses of the embedded machine learning system 103 that can be made between calibrations of the embedded machine learning system 103.

In some examples the apparatus 105 can be configured to determine a time during an opening or closing of the device 101 at which the calibration images should be displayed. For example, it can be determined that a calibration image should be displayed a predetermined time after the opening or closing of the device 101 has begun. This timing could take into account a predicted relative position of the respective portions of the device 101 at that time. The timing of the displaying of the calibration images can also take into account factors such as the frame rate of the imaging device 107 and the location of a rolling shutter of the imaging device 107. In some examples the timing of the display of the calibration images can be controlled so that the calibration images are only displayed for a single frame or for any other suitable length of time.

FIGS. 4A to 4D show an example device 101 in use for calibrating an embedded machine learning system 103.

Figure 4A:
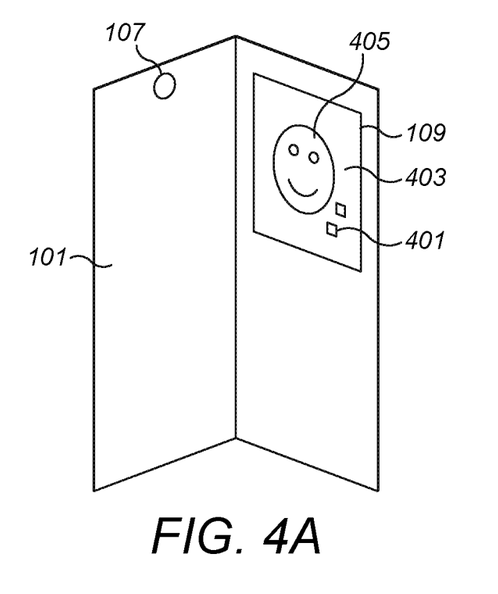
FIGS. 4A to 4D show an example device in use.
Figure 4B:
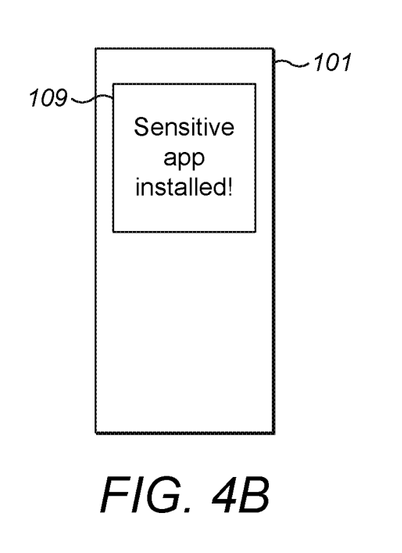
Figure 4C:
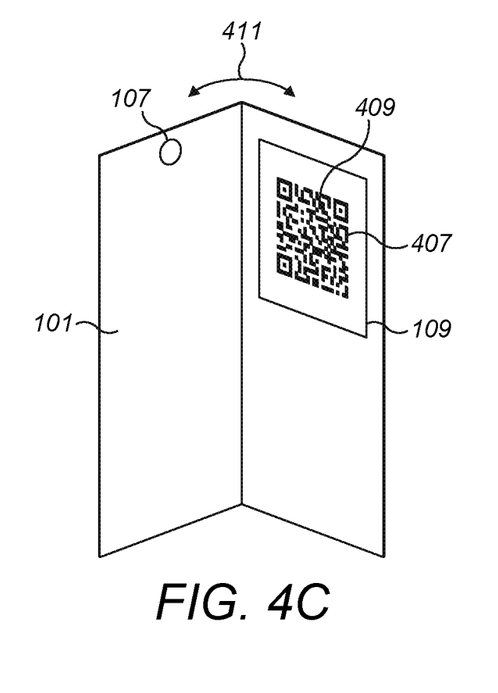

In the example of FIGS. 4A to 4D the device 101 is a foldable device that can be arranged in a folded configuration in which the imaging device 107 at least partially faces the display 109 of the device 101. In the examples of FIGS. 4A and 4C the device 101 is shown in a partially closed configuration. In this partially closed configuration, at least part of the display 109 falls within the field of view of the imaging device 107 so that the imaging device 107 can be used to obtain images of the images or other information that is displayed on the display 109. In the examples shown in FIGS. 4B and 4D the device 101 can be configured so that the portion of the device 101 that comprises the imaging device 107 is positioned behind the portion of the device 101 that comprises the display 109. This can provide an unobstructed view of the display 109 for the user. In other examples (not shown), the device 101 may be foldable so that when in a closed configuration, the portion of the device 101 that comprises the imaging device 107 is positioned to overlay the portion of the device 101 that comprises the display 109—this may be termed an "inwardly foldable device". In some examples, the device may have one or more further displays (not shown) for providing notifications and/or other information to the user. For example, the one or more further displays may be positioned on the rear side of either or both portions of an inwardly foldable device. Other configurations of the device 101 could be used in other examples of the disclosure.

In FIG. 4A a training image 403 is displayed on the display 109. The training image 403 comprises an image of an object 405 that the embedded machine learning system 103 is designed to recognise. In this example the object 405 comprises a face. The embedded machine learning system 103 could be configured to recognise the face of the user of the device 101 and/or any faces. Other objects 405 and types of objects 405 could be used in other examples of the disclosure.

The training image 403 comprises modifications 401 within the image. The modifications 401 to the training images 403 can comprise pixel level modifications. That is the modifications 401 to the training images 403 can comprise adjusting one or more pixels within an image 403. The modifications 401 can comprise minor modifications, that is a person looking at the training image 403 could still recognise the object 405 within the training image 403. The modifications 401 shown in FIG. 4A are not shown to scale.

It is to be appreciated that the modifications 401 could be smaller in examples of the disclosure.

The training image 403 can comprise an image that has been generated and/or modified by the apparatus 105 or device 101. For example, the training image 403 can comprise images that are retrieved from a memory of the device 101 that may comprise images personal to the user of the device 101. These images can then be modified using a neural network or any other suitable means, to generate the training images 403. Other types of training images could be used in other examples of the disclosure.

In some examples the training images 403 can be used for personalisation, or faster personalisation, of the embedded machine learning system 103. For example, the training images 403 can comprise images that are specific to the user of the device 101.

The training image 403 is displayed while the device 101 is in a partially closed configuration. This enables the imaging device 107 to be used to capture an image of the training image 403 while it is displayed on the display 109. This captured image can then be used to train the embedded machine learning system 103 to help to maintain the machine learning system 103 be configured to recognise the relevant objects 405.

In FIG. 4B a sensitive application is installed and/or opened for use on the device 101. A notification is displayed on the display 109 indicating that the sensitive application has been installed (additionally or alternatively, the notification may be displayed on one or more further displays of the device 101 (not shown)). The sensitive application could be an application for which the correct functioning of the embedded machine learning system 103 is critical. For example, it could be a health monitoring application or a security application or any other suitable application.

The device 101 can be configured so that the embedded machine learning system 103 is tested before the sensitive application is used to make sure that the embedded machine learning system 103 is functioning correctly. This can help to prevent critical errors during use of the sensitive application.

In FIG. 4C the embedded machine learning system 103 is being tested before the sensitive application is used. In order to test the embedded machine learning system 103 the device 101 is configured into a partially closed configuration with the display 109 in the field of view of the imaging device 107. The arrow 411 shows the device 101 being moved into an appropriate configuration. In some examples the user of the device 101 can be instructed to arrange the device 101 into the partially closed configuration. In these cases the relative portions of the device 101 could be stationary with respect to each other while test image 407 is being captured. In other examples the test image 407 can be displayed as the user opens up the device 101 for use. In such cases the relative portions of the device 101 could be moving with respect to each other while the test image 407 is being captured.

The test images 407 can comprise one or more patterns 409 that are recognized as the object that the embedded machine learning system 103 is designed to recognize, through use of the modified training images 403, as described above. The test images 407 could have the appearance of a random arrangement of pixels or a QR (Quick Response) code to an untrained observer.

In some examples the calibration images 403, 407 that are displayed on the display 109 can be geometrically distorted (also herein referred to as geometrically modified) to account for the configuration of the foldable device 101 when the imaging device 107 captures the images of the one or more calibration images 403, 407. In such examples the relative configuration of the foldable device 101 can be determined. This could be determined from a sensor in the hinge 111, or other suitable means, that could provide an indication of the relative angles between the respective components of the device 101. The sensor could be a strain gauge or any other suitable means. This information can then be used to determine the position of the display 109 relative to the imaging device 107 and the distortion that should be applied to the calibration image 403, 407 on the display 109 to correct for this relative position.

The geometric distortion can comprise scaling of the calibration images 403, 407, the placement of the calibration images 403, 407 on the display 109, translating a square or rectangular image into a trapezoid image, applying computational image correction to account for a minimum focus distance of the imaging device 107 and/or any other suitable geometric distortions.

Figure 4D:
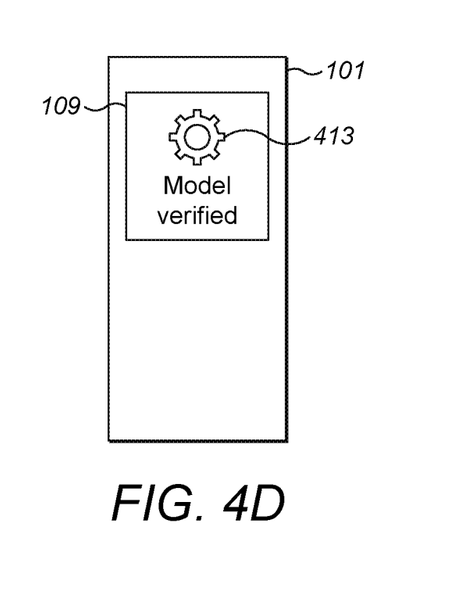

In FIG. 4D the embedded machine learning system 103 has correctly responded to the test image 407 and a notification 413 is displayed on the display 109 indicating that the embedded machine learning system 103 has been tested and verified (additionally or alternatively, the notification 413 may be displayed on one or more further displays of the device 101 (not shown)). The embedded machine learning system 103 can then be used for the sensitive application.

If the embedded machine learning system 103 had not responded correctly to the test image 107 then a different notification could be displayed to the user indicating that the embedded machine learning system 103 has not been verified. In addition to this notification, or instead of this notification the embedded machine learning system 103 could be prevented from being used for the sensitive application. In some examples the embedded machine learning system 103 could be reconfigured by being restored to initial settings or any other suitable prior settings. In some exampled the embedded machine learning system 103 could be reconfigured by the use of further training images 403 or by any other suitable retraining means.

FIGS. 5 and 6 show example methods that could be implemented by apparatus 105 and devices 101 as described herein. FIG. 5 shows a method of setting up a device 101 and FIG. 6 shows a method of using a device 101.

At block 501, as shown in FIG. 5, a pre-trained machine learning system 103 is employed by a device 101. The machine learning system 103 is used within a device 101 that also comprises an imaging device 107. The device 101 can be as shown in FIG. 1 or could be any other suitable type of device 101.

At block 503 the context of use of the machine learning system 103 is determined. For example, the target objects that are to be identified by the machine learning system 103 can be determined. In some examples the use of the identification of the objects can also be determined. For instance it can be determined whether or not the machine learning system 103 is to be used for a critical or sensitive application. In such cases the critical objects and data to be obtained by the machine learning system 103 can be identified.

At block 505 additional training data can be gathered for the machine learning system 103. The additional training data can comprise data relating to the use of the machine learning system 103. In some examples the training data can comprise images of the object or objects that are to be recognized by the machine learning system 103. This can enable a plurality of calibration images, such as training images 403 and/or test images 407, to be obtained.

At block 507 the calibration images 403, 407 can be geometrically modified. The geometrical modification can take into account the range of hinge angles of the device 101 that could be used. The geometric modifications can take into account the relative positions of the imaging device 107 and the display 109 when the device 101 is in an open or partially closed configuration. The relative positions of the imaging device 107 and the display 109 can be determined based on a sensed angle of the hinge 111 and the known positions of the imaging device 107 and the display 109, or by using any other suitable information.

A plurality of geometrically modified images can be obtained at block 507 to take into account different hinge angles and configurations that could be used to capture the calibration images 403, 407.

In some examples the geometric modification of the images can also take into account additional factors such as the focus limitations of the imaging device 107 and any other suitable factors.

At block 509 pixel modifications 401 are applied to the training images 403. The pixel modifications 401 can comprise changing the values of one or more pixels within a training image 403. The modifications of the pixels can be minor so that an untrained observer, such as the user of the device 101, might not notice the modification in the training image 403. Different pixel modifications 401 can be applied to different training images 403.

At block 511 timings for the display of the calibration images 403, 407 can be determined. The timings can be determined as a function of the angle of opening of the hinge 111 of the device 101. This can enable the calibration images 403, 407 to be displayed and captured as a user opens and closes the device 101. Other properties of the calibration image 403, 407 can also be determined. For instance, the geometric modification that is to be applied for the hinge angle could also be determined based on the images obtained at block 507.

The calibration images 403, 407 are stored at block 513. The calibration images 403, 407 can be stored in the memory 207 of the apparatus 105 or in any other suitable location. In some examples additional information can also be stored with the calibration images 403, 407. For instance, the expected outcome for a given test image 407 can be stored with the test image 407. This information can then be used to determine whether or not the machine learning system 103 has responded correctly to the test image 407.

Once the calibration images 403, 407 have been stored, then at block 515 the machine learning system 103 is ready for use.

FIG. 6 shows a method of using a device 101. The device 101 could have been set up as shown in FIG. 5.

At block 601 the device is opened or closed. The opening or closing of the device 101 can be detected by a sensor in the hinge 111 or by any other suitable means.

The apparatus 105 controls the device 101 to display one or more training images 403 on the display 109 at block 603. The training images 403 can be displayed as the device 101 is moved between the open and closed configurations.

The training image 403 that is displayed can be dependent upon the configuration of the device 101. The geometric modification that is applied to the training image 403 can be dependent upon the relative positions of the imaging device 107 and the display 109.

In some examples block 601 and 603 can be repeated at any suitable time. In some examples block 601 and 603 can be repeated every time the device 101 is moved between the open and closed configurations. In other examples block 601 and 603 can be repeated only after a predetermined time or a predetermined number of uses of the machine learning system 103 or at any other suitable interval.

At block 605 it is determined that a test of the machine learning system 103 is needed. The test could be needed because a sensitive application is to be used or because a predetermined amount of time or number of uses have occurred since the previous test or for any other reason. In some examples a notification can be provided to the user of the device 101 to provide an indication that the machine learning system 103 is to be tested.

At block 607 one or more test images 407 are displayed. The test images 407 can be displayed with an appropriate geometric modification as determined by the hinge angle of the device 101.

The imaging device 107 can capture images of the test image 407 and use these to test the machine learning system 103. The output of the machine learning system 103 that is provided in response to the test image 407 is compared to an expected response at block 609.

If, at block 609, it is determined that the response of the machine learning system 103 sufficiently matches the expected response then the method proceeds to block 611 and no action is needed by the apparatus 105 or device 101. In some examples a notification could be provided to the user to indicate that the machine learning system 103 has been verified.

If, at block 609, it is determined that the response of the machine learning system 103 does not sufficiently match the expected response then the method proceeds to block 613 and the user is notified that the machine learning system 103 has not been verified. The notification could be displayed on the display 109 or provided by any other suitable means. For example, the notification may be displayed on one or more further displays of the device 101 (not shown)).

In the example of FIG. 6, additional training images 403 can be displayed, at block 615, after it has been is determined that the response of the machine learning system 103 does not sufficiently match the expected response. These additional training images 403 can be used to retrain the machine learning system so that it can function correctly again. In such examples, after a plurality of training images have been used blocks 605 to 609 can be repeated to determine if the machine learning system 103 has been successfully retrained.

In the examples described in FIGS. 4A to 6 the device 101 is a foldable device so that the imaging device 101 can be configured to capture images displayed on the display 109 of the device itself. In other examples the device 101 need not be foldable but the device 101 could be configured to capture reflections of images from the display 109 or to capture images displayed by a second device. In such examples the user can be instructed to position the device 101 to enable the images to be captured. Such examples could enable a plurality of calibration images 403, 407 to be displayed rapidly which could speed up the training and/or testing of the machine learning system 103. For example, the timing of the displaying of the calibration images 403, 407 can also take into account factors such as the frame rate of the imaging device 107 and the location of a rolling shutter of the imaging device 107. In some examples the timing of the display of the calibration images can be controlled so that the calibration images are only displayed for a single frame or for any other suitable length of time.

In examples where the device 101 is not a foldable device geometric distortion could also be applied to the calibration image 403, 407. In such examples the calibration images 403, 407 could comprise images that have been captured by the imaging device 107 or otherwise stored in the memory of the device 101. The images could be geometrically distorted or modified using data obtained from other components of the device such as an inertial measurement unit, an accelerometer, a gyroscope or any other suitable means or combination of means. This could enable any relative motion and/or angle between the imaging device 107 and the displayed calibration images 403, 407 to be taken into account. In examples where the calibration image 403, 407 is displayed on a first device and captured by a second device then data obtained from both of the devices could be used to obtain more accurate geometric distortions. In some examples where the imaging device 107 captures reflections of the calibration images 403, 407 from a reflective surface, the relative motion and/or angle between the imaging device 107 and the reflective surface may be determined; this may be enabled by further using a detection and ranging technique and/or captured imagery of the reflective surface. This may allow determination of the geometric distortion or modification that is applied to respective calibration image 403, 407.

In the examples described in FIGS. 4A to 6 the device 101 is a personal user device such as a mobile phone or a laptop. Examples of the disclosure could be implemented in other types of devices. For instance, in some examples the apparatus 105 could be provided within a car or other vehicle that could be configured for image recognition. Other autonomous devices could also be configured with an apparatus 105 that could implement examples of the disclosure.

In the described examples the device 101 is described as being partially closed. It is to be appreciated that being partially closed is equivalent to being partially open.

Examples of the disclosure therefore provide for a convenient method of calibrating machine learning systems. In examples of the disclosure the device 101 that comprises the machine learning system can use images that it has generated itself to calibrate the machine learning system. In examples where the device 101 is a foldable device 101 the training and testing of the machine learning system 103 can be performed as the device 101 is being opened and closed by the user under normal use. This can be convenient for the user.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
at least one processor; and
at least one memory including computer program code,
the at least one memory storing instructions that, when executed by the at least one processor, cause the apparatus at least to:
enable at least one of a first device or second device to display a calibration image, the first device comprising an embedded machine learning system, wherein the calibration image is for calibrating the embedded machine learning system, and wherein the calibration image comprises a training image configured to enable training of the embedded machine learning system;
control an imaging device to capture, at least part of, the calibration image, wherein the imaging device is provided within the first device; and
based on the calibration image captured by the imaging device, calibrate the embedded machine learning system of the first device.

2. An apparatus as claimed in claim 1 wherein the training image comprises an image of subject matter that the embedded machine learning system has been designed to recognize.

3. An apparatus as claimed in claim 2 wherein the training image comprises modifications to enable training of the embedded machine learning system.

4. An apparatus as claimed in claim 1 wherein the calibration image comprises a test image configured to enable testing of the embedded machine learning system.

5. An apparatus as claimed in claim 4 wherein the test image comprises one or more patterns that are configured to provide one or more corresponding outputs from the embedded machine learning system that has been correctly trained.

6. An apparatus as claimed in claim 1 wherein the first device is a foldable device that can be arranged in a folded configuration in which the imaging device at least partially faces at least one display of the first device.

7. An apparatus as claimed in claim 6 wherein the at least one memory and the instructions stored therein are configured to, with the at least one processor, further cause the apparatus to: geometrically distort the calibration image to account for the configuration of the foldable device before the imaging device captures an image of the geometrically distorted calibration image.

8. An apparatus as claimed in claim 1 wherein the at least one memory and the instructions stored therein are configured to, with the at least one processor, further cause the apparatus to: enable the imaging device to capture a reflection of the calibration image displayed by the first device.

9. An apparatus as claimed in claim 1 wherein the at least one memory and the instructions stored therein are configured to, with the at least one processor, further cause the apparatus to: generate the calibration image; and display the generated calibration image on one or more displays of the first device.

10. An apparatus as claimed in claim 4 wherein the at least one memory and the instructions stored therein are configured to, with the at least one processor, further cause the apparatus to: in response to the embedded machine learning system responding incorrectly to the test image, provide an output.

11. An apparatus as claimed in claim 10 wherein the output comprises one or more of: restricting use of the embedded machine learning system; blocking use of the embedded machine learning system; providing a notification to a user of the first device; providing a notification to a user of the second device; or enabling a reconfiguration of the embedded machine learning system.

12. An apparatus as claimed in claim 1 wherein the at least one memory and the instructions stored therein are configured to, with the at least one processor, further cause the apparatus to: determine a timing for displaying the calibration image.

13. A method comprising:
enabling at least one of a first device or second device to display a calibration image, the first device comprising an embedded machine learning system wherein the calibration image is for calibrating the embedded machine learning system, and wherein the calibration image comprises a training image configured to enable training of the embedded machine learning system;

controlling an imaging device to capture, at least part of, the calibration image, wherein the imaging device is provided within the first device; and based on the calibration image captured by the imaging device, calibrating the embedded machine learning system of the first device.

14. The method of claim 13, wherein the first device is a foldable device that can be arranged in a folded configuration in which the imaging device at least partially faces at least one display of the first device.

15. The method of claim 14, further comprising geometrically distorting the calibration image to account for the configuration of the foldable device before the imaging device captures an image of the geometrically distorted calibration image.

16. A non-transitory computer readable medium comprising program instructions stored thereon for causing an apparatus to perform at least the following:

enable at least one of a first device or second device to display a calibration image, the first device comprising an embedded machine learning system, wherein the calibration image is for calibrating the embedded machine learning system, and wherein the calibration image comprises a test image configured to enable testing of the embedded machine learning system;

control an imaging device to capture, at least part of, the calibration image, wherein the imaging device is provided within the first device; and based on the calibration image captured by the imaging device, calibrate the embedded machine learning system of the first device.

17. The non-transitory computer readable medium of claim 16, wherein the first device is a foldable device that can be arranged in a folded configuration in which the imaging device at least partially faces at least one display of the first device.

18. The non-transitory computer readable medium of claim 17, wherein the program instructions are further configured to cause: geometrically distorting the calibration image to account for the configuration of the foldable device before the imaging device captures an image of the geometrically distorted calibration image.

19. An apparatus as claimed in claim 1, wherein the at least one memory and the instructions stored therein are configured to, with the at least one processor, further cause the apparatus to:

enable the calibration image to be displayed by a second device, wherein the first device is positioned so that the second device is within the field of view of the imaging device.

20. The non-transitory computer readable medium of claim 16, wherein the program instructions are further configured to cause:

provide an output in response to capturing the calibration image; and determine, based on the output, whether the embedded machine learning system satisfies a threshold level of accuracy.

* * * * *